US011421450B2

(12) United States Patent
Okuma

(10) Patent No.: US 11,421,450 B2
(45) Date of Patent: Aug. 23, 2022

(54) DOOR HANDLE DEVICE FOR VEHICLE

(71) Applicant: ALPHA CORPORATION, Kanagawa (JP)

(72) Inventor: Ryoya Okuma, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 302 days.

(21) Appl. No.: 16/653,141

(22) Filed: Oct. 15, 2019

(65) Prior Publication Data
US 2020/0040617 A1 Feb. 6, 2020

Related U.S. Application Data

(63) Continuation of application No. PCT/JP2018/017339, filed on Apr. 27, 2018.

(30) Foreign Application Priority Data

Apr. 27, 2017 (JP) .............................. JP2017-087978

(51) Int. Cl.
B60J 5/04 (2006.01)
E05B 79/22 (2014.01)
E05B 85/12 (2014.01)
E05B 77/52 (2014.01)
E05B 79/06 (2014.01)
E05B 83/38 (2014.01)

(52) U.S. Cl.
CPC .............. E05B 79/22 (2013.01); B60J 5/0479 (2013.01); E05B 85/12 (2013.01); E05B 77/52 (2013.01); E05B 79/06 (2013.01); E05B 83/38 (2013.01)

(58) Field of Classification Search
CPC .......... E05B 79/22; E05B 85/12; E05B 77/52; E05B 79/06; E05B 83/38; B60J 5/0479; B60J 5/04
See application file for complete search history.

(56) References Cited

U.S. PATENT DOCUMENTS

2004/0104595 A1 6/2004 Carey et al.
2013/0134722 A1 5/2013 Naka

FOREIGN PATENT DOCUMENTS

JP 2012-215034 A 11/2012
JP 2013-112979 A 6/2013

OTHER PUBLICATIONS

International Search Report issued in PCT/JP2018/017339; dated Jul. 24, 2018.
Written Opinion issued in PCT/JP2018/017339; dated Jul. 24, 2018.

Primary Examiner — Kristina R Fulton
Assistant Examiner — Thomas L Neubauer
(74) Attorney, Agent, or Firm — Studebaker & Brackett PC

(57) ABSTRACT

A door handle device for a vehicle includes a handle body configured to be rotationally operated, an output lever configured to be operated in a plane parallel to a rotation axis of the handle body, a clutch member; and a detection member. The clutch member is configured to move translationally in a plane parallel to an operating surface of the output lever, configured to be driven by the handle body in a rotational operation direction of the handle body, and configured to move between a connected location and a disconnected location along a rotation axis of the handle body.

8 Claims, 8 Drawing Sheets

DOOR HANDLE DEVICE FOR VEHICLE

CROSS REFERENCE TO RELATED APPLICATIONS

This application is a continuation of PCT application No. PCT/JP2018/017339, which was filed on Apr. 27, 2018 based on Japanese Patent Application No. 2017-087978 filed on Apr. 27, 2017, the contents of which are incorporated herein by reference.

TECHNICAL FIELD

The present invention relates to a door handle device for a vehicle.

BACKGROUND ART

Patent Literature 1 discloses a door handle of a vehicle. In the door handle for a vehicle of Patent Literature 1, the handle device includes an inner handle (handle body) that is rotationally operated, a handle side transmission lever, an operation member, and a latch side transmission lever. As the handle body is rotationally rotated, the handle side transmission lever moves in a direction parallel to a rotation axis of a handle body 2, and is pivotable around a connection point with the handle body. The operation member moves translationally between a protruding position and a retracted position in a direction perpendicular to a translational movement direction of the handle side transmission lever. The latch side transmission lever includes a pin-shaped engaging portion inserted into a guide groove hole formed in the handle side transmission lever, and rotates around a rotation axis perpendicular to the rotation axis of the handle body.

The guide groove hole of the handle side transmission lever includes a long hole portion that is long in an upper-lower direction and a step portion formed by widening the long hole portion. The engaging portion of the latch side transmission lever is biased in a swinging direction by a compression spring so as to be unlocked from the step portion of the guide groove hole.

Even if the handle body is operated to move the handle side transmission lever in this state, the latch side transmission lever does not operate since the engaging portion of the latch side transmission lever is not locked to the step portion.

This state corresponds to the retracted position of the operation member, and when the operation member shifts from this state to the protruding state, the handle side transmission lever is pushed by the operation member, the handle side transmission lever pivots to a position where the engaging portion corresponds to the step portion of the guide through hole when being pushed by the operation member. When an operation handle is operated in this state, the latch side transmission lever follows the translational movement of the handle side transmission lever, and the latch side transmission lever rotates.

However, a structure for holding the handle-side transmission lever to be pivotable and movable in the upper-lower direction and biasing the handle side transmission lever in a predetermined pivoting direction by the compression spring is complicated. Further, the compression spring that biases the handle side transmission lever is in a maximum deflection state in a normal state in which the handle body is not operated. Therefore, if the door handle device is used for a long period of time, the spring force of the compression spring may disappear.

CITATION LIST

Patent Literature

[Patent Literature 1] JP-A-2013-112979

SUMMARY OF INVENTION

According to one or more embodiments of the present invention, a door handle device for a vehicle has a simple structure and provides stable performance over a long period of time.

According to one or more embodiments of the present invention, the door handle device for a vehicle includes a handle body, an output lever, a clutch member, and a detection member. The clutch member moves between a connected position and a disconnected position along a rotation axis of the handle body. The detection member drives the clutch member from the connected position to the disconnected position as the detection member moves from a protruding position to a retracted position. A clutch portion is formed either at a connection section between the clutch member and the handle body or at a connection section between the clutch member and the output lever. The connection of the clutch portion is released as the clutch member moves to the disconnected position.

DESCRIPTION OF EMBODIMENTS

Figure 1A:
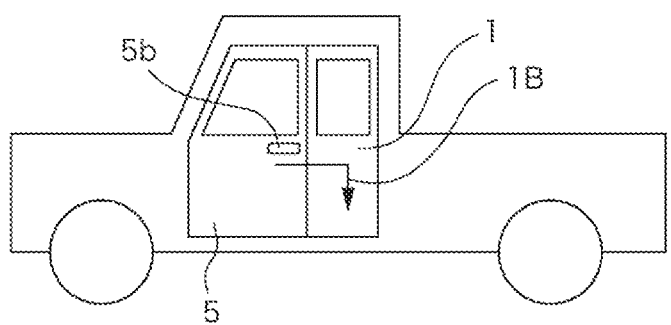
FIG. 1A is a side view of a vehicle.

FIG. 1A shows a vehicle mounted with a handle device. The vehicle is mounted with a front door (overlapping side door 5) pivotally supported at a front end edge and disposed in a front portion of the vehicle, and a rear door (overlapped side door 1) pivotally supported at a rear end edge and disposed in a rear portion of the vehicle. The front door 5 and the rear door 1 are horizontally rotatable around pivot shafts 5a, 1a respectively, and are rotationally operated in an outward direction as shown by an arrow R in FIG. 1B so as to be opened. In order to open the front door 5, an outside handle 5b is mounted on a vehicle exterior wall surface of the front door 5.

Figure 1B:
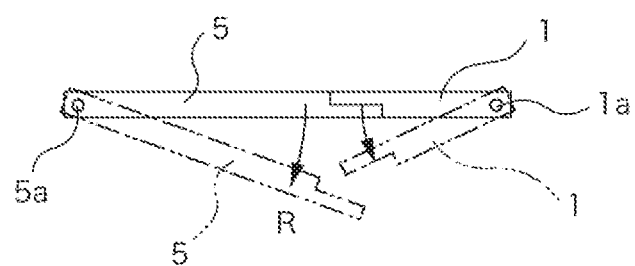
FIG. 1B is a sectional view taken along a line 1B in FIG. 1A.

As shown in FIG. 1B, in a door-closed state, the front door 5 and the rear door 1 overlap each other in a state where a rotation end of the rear door 1 is located on a lower side (overlapped side) and a rotation end of the front door 5 is on an upper side (overlapping side), and the handle device is mounted on an interior wall surface of the rear door 1.

The handle device also functions as a lock device in addition to using the handle body 2 as a handle at the time of opening and closing operations of the rear door 1. When the handle body 2 is rotationally operated, lock rods 12 are driven in a vehicle height direction, and the lock rods 12 advance into and retract from lock holes (not shown) formed in a door frame. As a result, a locked state of the rear door 1 is maintained or the locked state is released.

Figure 8A:
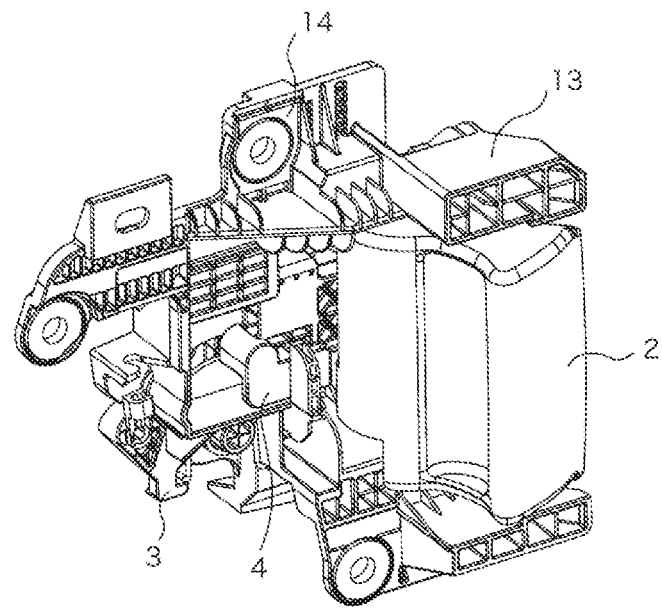
FIG. 8A is a perspective view of the handle device as viewed from a front surface direction.
Figure 8B:
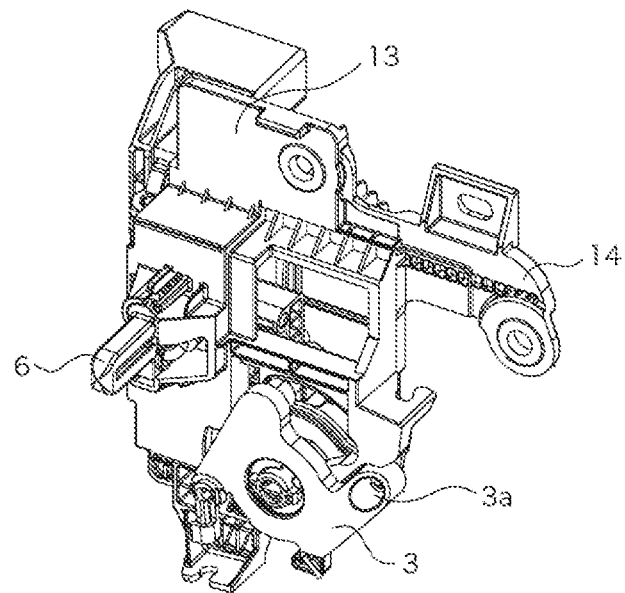
FIG. 8B is a perspective view of the handle device as viewed from a back surface direction.

As shown in FIGS. 8A and 8B, in the handle device, the handle body 2, an output lever 3, a detection member 6, and a clutch member 4 are mounted on a handle base 13. The handle base 13 is provided with a panel mounting piece 14 in which a fastener insertion hole 14a is formed. The handle device is fixed to an inner panel 1b of the rear door 1 by using a fastener inserted through the fastener insertion hole 14a (see FIG. 4).

The handle body 2 is an injection molded product of a synthetic resin material. The handle body 2 is pivotally supported in a rotatable manner by the handle base 13 by using a pivot shaft (not shown) whose axial length direction is directed in an upper-lower direction (vehicle height direction) in a posture in which an operation portion 2a is directed in an interior direction. Hereinafter, unless otherwise specified, the vehicle height direction of the vehicle mounted with the handle device is referred to as "upper and lower", a vehicle length direction is "front and rear", an interior side in a vehicle width direction is a "front surface", and an opposite side is a "back surface".

Figure 5A:
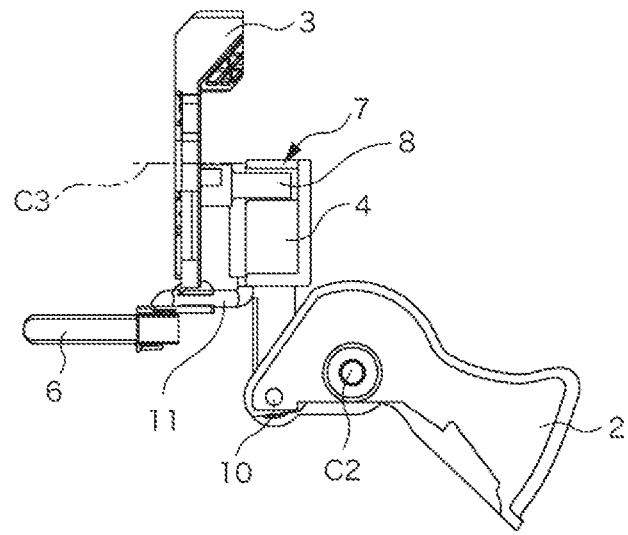
FIG. 5A is viewed from a direction of an arrow 5A in FIG. 4 in a state in which a clutch portion is connected.
Figure 6A:
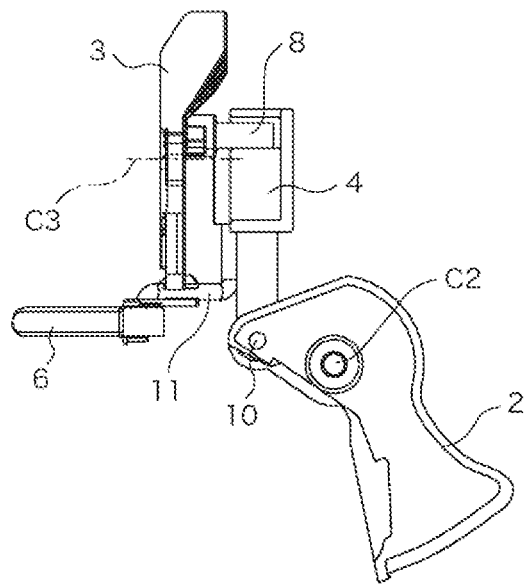
FIG. 6A is a view corresponding to FIG. 5A showing a state in which a handle body is operated.

The handle body 2 is rotatable between an initial rotational position shown in FIG. 5A and an operation rotational position (see FIG. 6A) rotated counterclockwise in FIG. 5A from the initial rotational position. The handle body 2 is biased toward the initial rotational position by a torsion spring (not shown) or the like.

Figure 3:
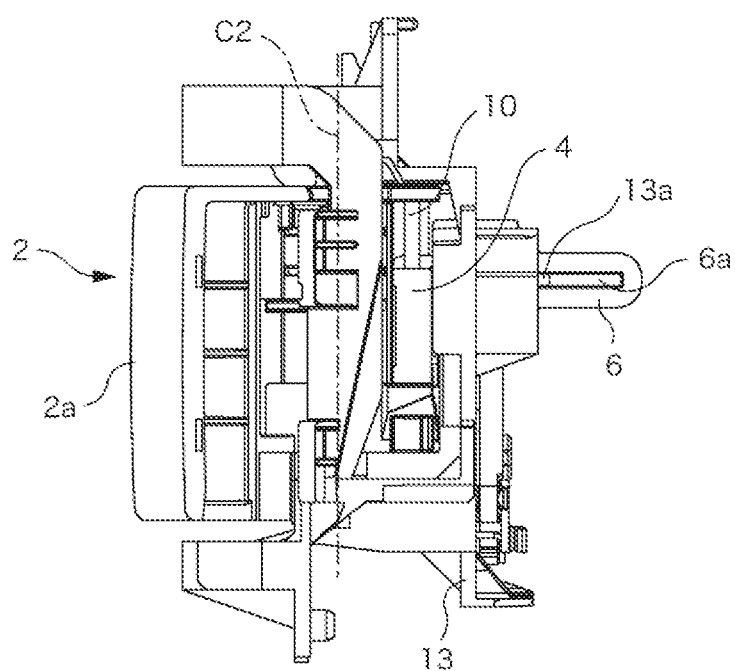
FIG. 3 is viewed from a direction of an arrow 3A of FIG. 2.

As shown in FIG. 3, a sliding shaft 10 parallel to a rotation axis (C2) is fixed to the handle body 2. A clutch member 4 is slidably mounted on the sliding shaft 10. The clutch member 4 is movable in a tangential direction of a rotation trajectory of the handle body 2 passing through the sliding shaft 10 by a guide (not shown). A sliding hole through which the sliding shaft 10 penetrates is formed as a long hole in order to absorb the displacement in a centripetal direction associated with the rotation of the handle body 2.

Figure 4:
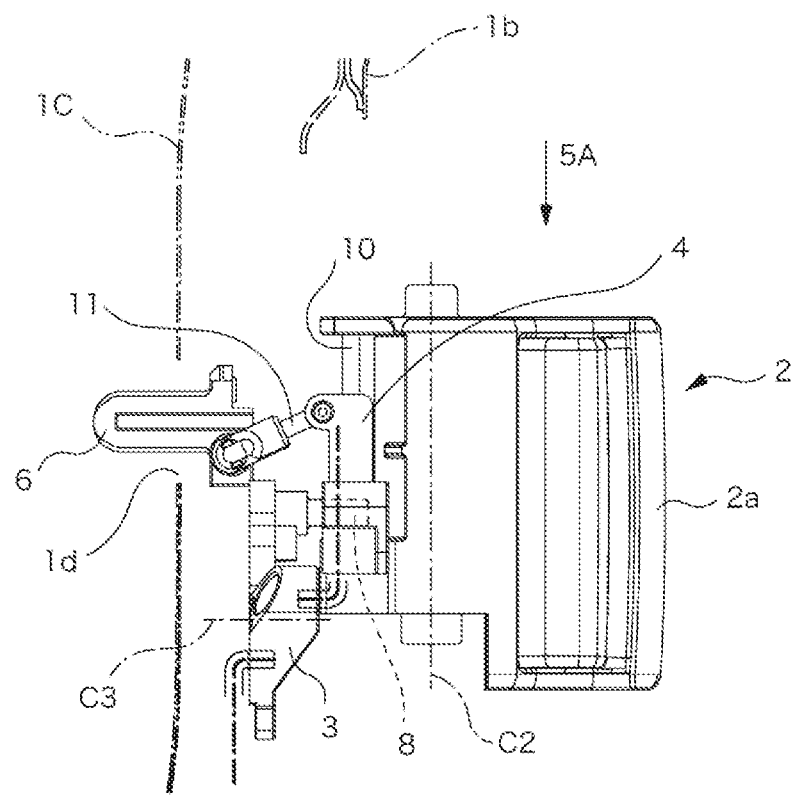
FIG. 4 is viewed from a direction of an arrow 4A of FIG. 2.

The clutch member 4 moves between a connected position shown in FIG. 4 and a disconnected position moved upward along the sliding shaft 10 following the movement of the detection member 6.

Figure 2:
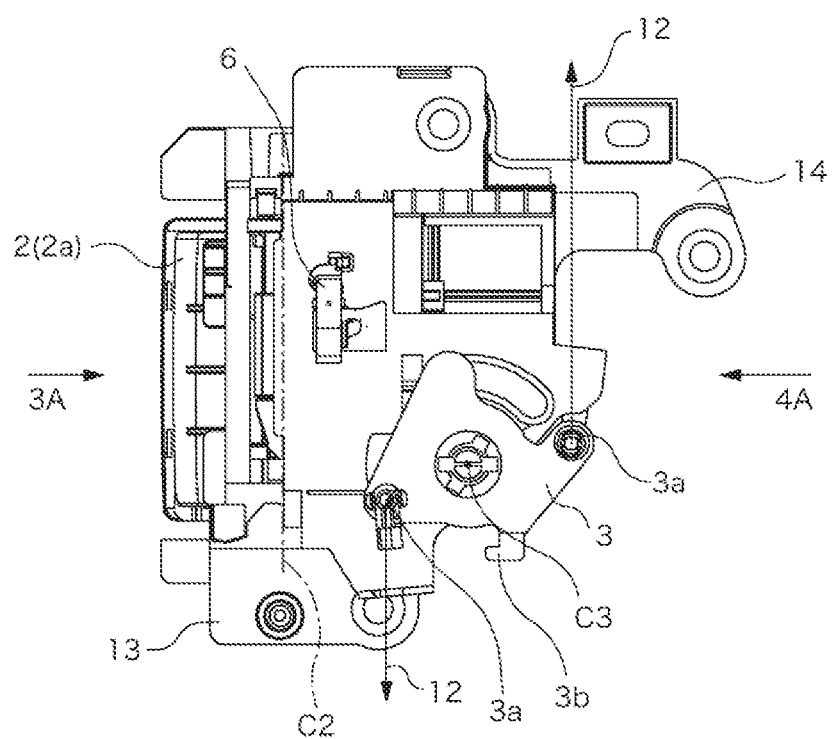
FIG. 2 is a back view of a handle device.

The output lever 3 is connected to the handle base 13 to be rotatable about a rotation axis (C3). As shown in FIG. 2, the rotation axis (C3) of the output lever 3 is disposed at a torsion position perpendicular to the rotation axis (C2) of the handle body 2. As a result, as shown in FIG. 4, the output lever 3 is rotationally driven in a plane parallel to the vehicle length direction in a space sandwiched between the front and back door panels 1b, 1c.

As shown in FIGS. 2 and 4, a pair of rod connecting holes 3a are formed in the output lever 3 at point symmetrical positions with respect to the rotation axis (C3). The lock rods 12 are connected to the respective connecting holes 3a. The output lever 3 is biased in a direction in which the lock rod 12 enters the lock hole by a torsion spring (not shown). One end of the torsion spring is locked to the handle base. The other end of the torsion spring is locked to a spring hooking portion 3b provided on the output lever 3.

Figure 5B:
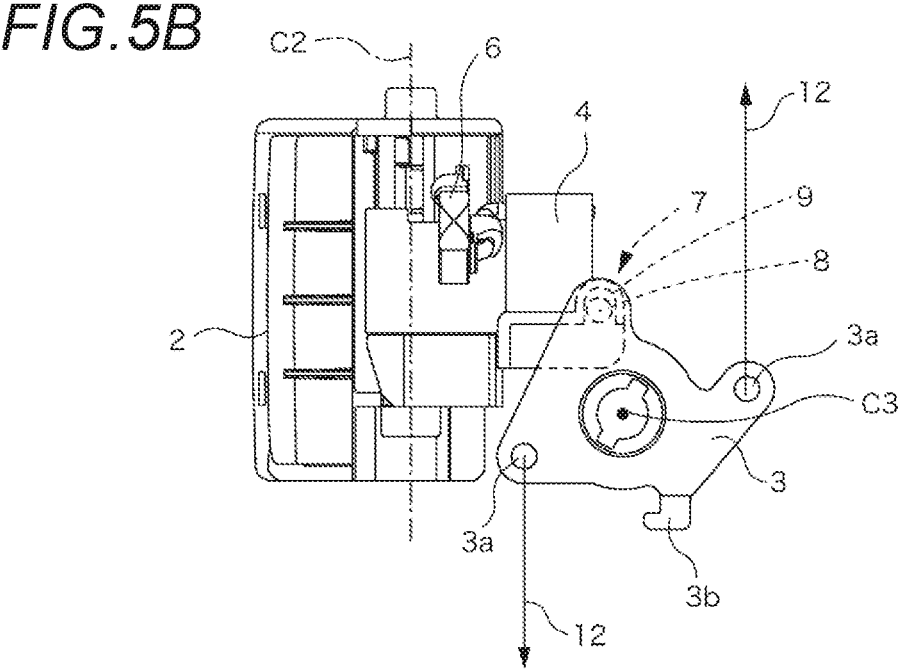
FIG. 5B is a view corresponding to FIG. 2 in the state in which the clutch portion is connected.

A clutch portion 7 is configured in cooperation with the output lever 3 (a connection/disconnection object) at a lower end portion of the clutch member 4. The clutch portion 7 is formed by a clutch protrusion 8 protruding to the output lever 3 and a clutch protrusion 9 protruding to the clutch member 4. As shown in FIGS. 5A and 5B, the clutch protrusion 8 of the output lever 3 is formed in a boss shape, and the clutch protrusion 9 of the clutch member 4 is formed as a U-shaped wall surface. A fitting recessed portion 15 surrounded by the U-shaped wall surface has a width dimension that allows the clutch protrusion 8 on an output lever 3 side to enter and opens downward (see FIGS. 7A and 7B).

Figure 6B:
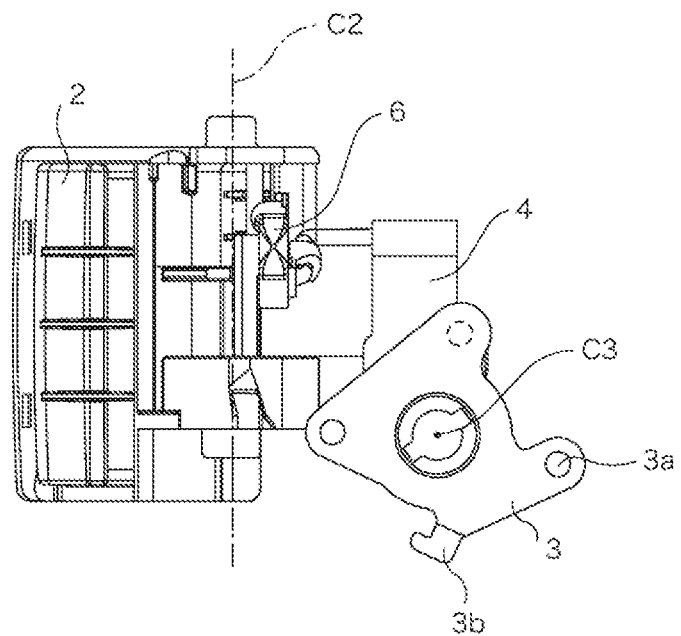
FIG. 6B is a view corresponding to FIG. 5B showing a state in which a handle body is operated.

As shown in FIG. 5B, the clutch protrusion 8 on the output lever 3 side enters the fitting recessed portion 15 when the clutch member 4 is at the connected position, that is, at an upper end position of a moving stroke. When the handle body 2 is rotationally operated counterclockwise in FIG. 5A from a state shown in FIG. 5B, the clutch member 4 moves in a back surface direction, that is, to a right side in FIG. 5B. After the clutch protrusion 9 of the clutch member 4 comes into contact with the clutch protrusion 8 of the output lever 3 as the clutch member 4 moves in the back direction, the output lever 3 is moved downward, and as a result, the output lever 3 is driven to rotate clockwise as shown in FIG. 6B.

As described above, the fitting recessed portion 15 is opened downward so as to be relatively movable upward with respect to the clutch protrusion 8 on the output lever 3 side, and the state in which the clutch member 4 moves upward corresponds to the disconnected position.

Figure 7A:
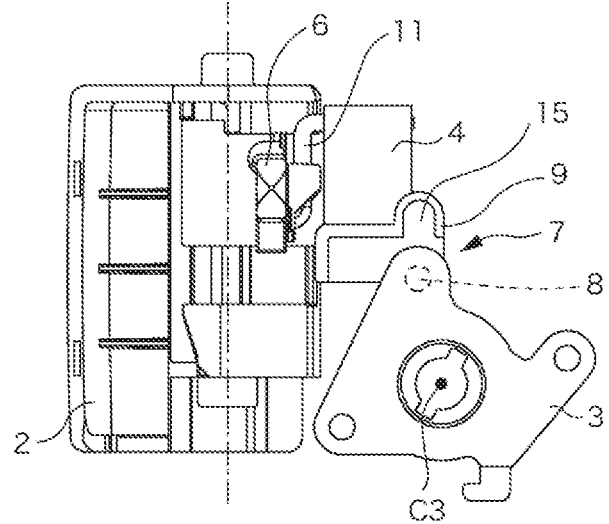
FIG. 7A is a view corresponding to FIG. 5B showing a handle device in a state in which the clutch portion is disconnected.
Figure 7B:
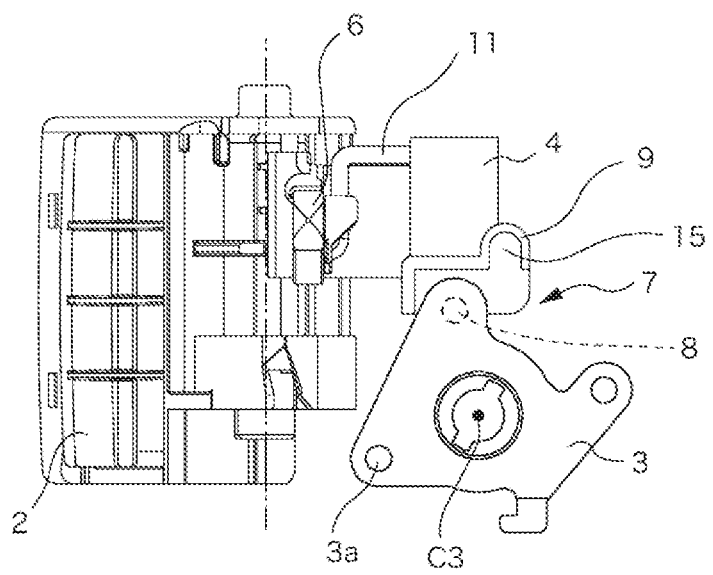
FIG. 7B is a view showing a state in which an operation force to the handle body is not transmitted.

As shown in FIG. 7A, when the clutch member 4 is in the disconnected position, the clutch protrusion 8 on the output lever 3 side is detached from the fitting recessed portion 15. In this state, even if a rotational operation force is applied to the handle body 2 to move the clutch member 4 in the back surface direction, as shown in FIG. 7B, since the clutch protrusion 9 on the clutch member 4 side which presses the clutch protrusion 8 on the output lever 3 side does not present, the output lever 3 is not rotated.

Further, as shown in FIG. 4, the detection member 6 is disposed so as to be able to advance and retract in the vehicle width direction, that is, in the front-back direction from a detection hole 1d formed in the exterior side door panel 1c, and is biased in the back surface direction by a compression spring (not shown). As shown in FIG. 3, a guide groove 6a for moving translationally in the front-back direction is formed in the detection member 6, and a guide protrusion 13a formed on the handle base 13 is slidably fitted.

The detection member 6 is connected to the clutch member 4 via a transmission rod 11, and when a tip end of the detection member 6 is pushed in a surface direction from a state of FIG. 4, the clutch member 4 moves upward. The detection member 6, the clutch member 4, the transmission rod 11, and the handle base 13 constitute a link mechanism, and the clutch member 4 moves in synchronization with the operation of the detection member 6.

In the present embodiment, in a state in which the front door 5 is not overlapped with the rear door 1, the detection member 6 is in a protruding state, and the clutch member 4 is located at the connected position. As described above, when the clutch member 4 is in the connected position, an operation force to the handle body 2 is transmitted to the output lever 3, and the lock rod 12 is pulled out in a detaching direction from the lock hole.

When the front door 5 is closed from this state and overlapped with the rear door 1, the detection member 6 is pushed by the front door 5, and as a result, the clutch member 4 moves to the disconnected position. When the clutch member 4 is in the disconnected position, even if the handle body 2 is operated, the output lever 3, that is, the lock rod 12 does not operate, and the locked state of the rear door 1 is prevented from being released with the front door 5 being closed.

In the above description, the clutch protrusion 9 on the clutch member 4 side is formed as a U-shaped wall, and the clutch protrusion 8 on the output lever 3 side is formed in the boss shape, but conversely, the clutch protrusion 9 on the clutch member 4 side can also be formed in the boss shape.

Further, the clutch portion 7 may be formed not only at the connection section between the clutch member 4 and the output lever 3, but also at the connection section between the handle body 2 and the clutch member 4. In this case, the handle body 2 corresponds to the connection/disconnection object.

According to the embodiment, a door handle device for a vehicle is mounted on the vehicle in which the door handle device is mounted on an overlapped side door 1 of a pair of doors of which rotating ends are overlapped in a door-closed state. According to the embodiment, the door handle device for a vehicle includes a handle body 2 configured to be rotationally operated; an output lever 3 configured to be operated in a plane parallel to a rotation axis (C2) of the handle body 2; a clutch member 4 configured to move translationally in a plane parallel to an operating surface of the output lever 3, configured to be driven by the handle body 2 in a rotational operation direction of the handle body 2, and configured to move between a connected location and a disconnected location along a rotation axis of (C2) the handle body 2; and a detection member 6 configured to be biased toward a protruding position side and translationally movable between a protruding position and a retracted position when an overlapped side door 5 is interfered, and configured to drive the clutch member 4 from a connected position to a disconnected position as the detection member 6 moves from the protruding position to the retracted position.

A clutch portion 7 is formed either at a connection section (first connection section) between the clutch member 4 and the handle body 2 or at a connection section (second connection section) between the clutch member 4 and the output lever 3. The connection of the clutch portion 7 is released as the clutch member 4 moves to the disconnected position, and the transmission of an operation force to the handle body 2 is released from an upstream side member to a downstream side member.

According to the embodiment, the clutch member 4 is disposed between the handle body 2 and the output lever 3. The clutch portion 7 is formed either at the connection section between the clutch member 4 and the handle body 2 or at the connection section between the clutch member 4 and the output lever 3. The connection section on the side where the clutch portion 7 is not formed is always connected to each other and transmits the rotational operation force of the handle body 2 to the clutch member 4 or transmits the operation force from the clutch member 4 to the output lever 3.

The clutch member 4 is movable in a plane orthogonal to the rotation axis (C2) of the handle body 2, that is, in addition to the direction of transmitting the rotational operation force to the handle body 2, the clutch member 4 can be moves translationally in a direction along the rotation axis (C2). The connected position and the disconnected position of the clutch member 4 are set in a direction along the rotation axis (C2). The connected state between a disconnection object constituting the clutch unit 7 in cooperation with the clutch member 4 and the clutch member 4 is determined by the position of the clutch member 4, and the position of the clutch member 4 is determined by the protruding and the retracted states of the detection member 6.

By operating the output lever 3 in the plane parallel to the rotation axis (C2) of the handle body 2 and disposing the clutch member 4 on the surface parallel to the operation surface of the output lever 3, it is possible to give an movement amount of the clutch member 4 driven in the rotation tangential direction of the handle body 2 by the operation force of the handle body 2 as an input of the output lever 3.

Since a connected/disconnected state is switched by moving the clutch member 4 along the rotation axis (C2) of the handle body 2, it is unnecessary to cause the clutch member 4 and the detection member 6 to perform complicated operations. Therefore, a structure of the door handle device for a vehicle is simplified, and operation reliability is improved.

According to the embodiment, the clutch portion 7 includes the pair of clutch protrusions 8, 9 which are formed on both of the clutch member 4 and a connection/disconnection object to be connected or disconnected with the clutch member 4, are adjacent to each other in a moving direction associated with the rotational operation of the handle body 2 when the clutch member 4 is in the connected position, and transmit the operation force from an upstream side member to a downstream side member in a contact state.

The clutch portion 7 is formed by protruding the pair of clutch protrusions 8, 9 on both of the clutch member 4 and the connection/disconnection object to be connected or disconnected with the clutch member 4. The clutch protrusions 8, 9 are configured to be adjacent to each other in the moving direction associated with the rotational operation of the handle body 2 in the case where the clutch portion 7 is formed between the handle body 2 and the clutch member 4, and the handle body 2 of the clutch protrusions 8 and 9 formed on the clutch member 4 in the case where the clutch portion is formed between the clutch member 4 and the output lever 3, and the clutch protrusions 8, 9 come into contact with each other to transmit the operating force from the upstream side to the downstream side.

On the other hand, since the relationship between the clutch protrusions 8, 9 is eliminated when the clutch member 4 is in the disconnected position, the operation force to the handle body 2 is not transmitted to the output lever 3 in an idle state.

According to the embodiment, since the connection/disconnection is determined by the adjacency relationship between the clutch protrusions 8, 9, the structure of the clutch portion 7 is simplified.

According to the embodiment, the clutch portion 7 is formed between the clutch member 4 and the output lever 3. The handle body 2 is provided with the sliding shaft 10 parallel to the rotation axis (C2) of the handle body 2. The clutch member 4 is slidably mounted on the sliding shaft 10.

The clutch member 4 can be mounted on the handle base holding the handle body 2 so as to be movable in a predetermined direction, but in a case where the clutch portion 7 is formed between the clutch member 4 and the output lever 3, when the clutch member 4 is slidably mounted on the sliding shaft 10 provided on the handle body 2, the structure is simplified.

According to the embodiment, the detection member 6 and the clutch member 4 are connected via the transmission rod 11. The detection member 6, the transmission rod 11, and the clutch member 4 constitute a link mechanism in which the clutch member 4 follows the movement of the detection member 6.

In order to operate the clutch member 4 by translational movement of the detection member 6, the clutch member 4 and the detection member 6 can be brought into contact with each other through an inclined surface, but when the clutch member 4 and the detection member 6 are connected via the transmission rod 11, since a frictional resistance or the like on the inclined surface is eliminated, a smooth operation can be obtained.

According to the embodiment, the operating surface of the output lever 3 is disposed along the vehicle length direction.

When the door handle device is mounted on a double-hinged door, the output lever 3 is connected with the lock rods that advance to and retract from the lock holes formed in the door frame to lock and unlock the door. The lock rods are connected in symmetrical positions with respect to the rotation center of the output lever 3 and are formed to advance into and retract from upper and lower ends of the doors to the corresponding lock holes.

Therefore, when the operating surface of the output lever 3 is disposed along the vehicle length direction (that is, when the rotation axis (C2) is disposed along the vehicle width direction in a case where the output lever 3 is rotationally operated), the disposition routes of the lock rods in the door can be easily ensured. When the operating surface of the output lever 3 is set to a plane along the vehicle width direction, in a case where reinforcing plates or the like are disposed in a stacked manner in the vehicle width direction, a layout is required to prevent interference between the reinforcing plates and the output lever 3 or the lock rods. On the other hand, according to the embodiment, since the output lever 3 is disposed on the surface along the vehicle length direction, and the disposition surface is the operating surface, the output lever 3 and the lock rods need only be disposed in a gap of reinforcing plates or the like, and layout considerations are not necessary.

REFERENCE SIGNS LIST 1 overlapped door
2 handle body
3 output lever
4 clutch member
5 overlapping door
6 detection member
7 clutch member
8, 9 clutch protrusion
10 sliding shaft
11 transmission rod
C2 rotation axis of handle body

What is claimed is:

1. A door handle device for opening a door of a vehicle comprising:
 a handle body configured to be rotationally operated;
 an output lever configured to be operated in a plane parallel to a rotation axis of the handle body;
 a clutch member; and
 a detection member,
 wherein the clutch member is configured to move translationally in a plane parallel to an operating surface of the output lever, configured to be driven by the handle body in a rotational operation direction of the handle body, and configured to move between a connected location and a disconnected location along a rotation axis of the handle body,
 wherein the detection member is configured to be biased toward a protruding position side and translationally movable between a protruding position and a retracted position, and configured to drive the clutch member from a connected position to a disconnected position as the detection member moves from the protruding position to the retracted position,
 wherein a first connection section is positioned between the clutch member and the handle body,
 wherein a second connection section is positioned between the clutch member and the output lever,
 wherein a clutch portion is positioned at the first connection section or at the second connection section, and
 wherein the connection of the clutch portion is released as the clutch member moves to the disconnected position and disconnects transmission of an operation force input to the handle body to the output lever.

2. The door handle device for a vehicle according to claim 1,
 wherein a door handle device for the vehicle is mounted on an overlapped side door of a pair of doors of which rotating ends are overlapped in a door-closed state, and
 wherein the detection member is located in the retracted position when the overlapped side door interferes with an overlapped side door.

3. The door handle device of the vehicle according to claim 1,
 wherein the clutch portion includes a pair of clutch protrusions, a first clutch protrusion of the pair of clutch protrusions being formed on the clutch member and a second clutch protrusion of the pair of clutch protrusions being formed on the connection/disconnection object to be connected or disconnected with the clutch member by way of the pair of clutch protrusions, and
 wherein the pair of clutch protrusions are engaged with each other to transmit the operation force to the output lever when the clutch member is in the connected position.

4. The door handle device for a vehicle according to claim 3,
 wherein the connection/disconnection object is either the handle body or the output lever.

5. The door handle device for a vehicle according to claim 1,
 wherein the clutch portion is positioned at the second connection section.

6. The door handle device for a vehicle according to claim 1,
 wherein the clutch member is slidably mounted on a sliding shaft provided on the handle body and parallel to the rotation axis of the handle body.

7. The door handle device for a vehicle according to claim 1,
 wherein the detection member and the clutch member are connected via a transmission rod,
 wherein the detection member, the transmission rod, and the clutch member constitute a link mechanism, and
 wherein the clutch member follows the movement of the detection member.

8. The door handle device for a vehicle according to claim 1,
wherein the operating surface of the output lever is disposed along a vehicle length direction.

\* \* \* \* \*